Patented Sept. 9, 1947

2,427,323

UNITED STATES PATENT OFFICE 2,427,323

PRODUCTION OF ACIDIFIED MALT

Thomas Robert Dixon, Pampisford, England, assignor to The Enzymic Malt Company Limited, Ipswich, Suffolk, England No Drawing. Application March 16, 1944, Serial No. 526,818. In Germany April 24, 1937

2 Claims. (Cl. 195—70)

In the specification of British Letters Patent No. 339,047 there is described a process of malting cereals, e. g. for use in the brewing of beer and the like, the preparation of vinegar, the distillation of spiritous liquors (including the preparation of bakers' yeast) and for similar purposes, according to which the cereal is treated with a solution of an organic acid such as lactic acid as soon as the testa is broken by natural growth, or after germination in order to stimulate and accelerate the action of the enzymes of the grain.

The present invention consists in an improved method of carrying out that process and has for its object the production of acidified malt with the aid of biological lactic acid, the malting process itself being thereby simplified and the production of the lactic acid is cheapened, the latter being substantially produced in one stage of the malting process.

The invention is based on the following unexpected discovery. When malt in which the embryo has developed on the floor, in the usual way is steeped in a solution of lactic acid, in a steeping vat, not only does a portion (about 25% of the entire solution) of the lactic acid pass into the corns, but, at the same time, the degree of acidity of the residual solution increases considerably. If this residual solution be used in the next malting operation, for steeping the malt and embryo, the acidity is further intensified. This increase, however, has a limit, which is reached, approximately, when the acidity corresponds with a consumption (for neutralisation) of 36 cc. of normal caustic soda solution per 100 cc. of the liquid, 1 cc. corresponding with 90 milligrams of lactic acid. In this way, starting with an acid content corresponding with 14 cc. of normal caustic soda solution, that content will have increased to an extent corresponding with 36 cc. of the soda solution, when the acid solution has been used 10 times, after which it does not increase during further use.

At the same time, the approximately 25% of liquid passing into the malt must be replenished at each new period of the process. This is accomplished advantageously by using a liquid containing nutrient material for the formation of the lactic acid, which liquid can be obtained, in known manner, by the "conversion" of crushed malt, or crushed malt mixed with other crushed cereals, at about 70° C.

This process might be continued indefinitely, were it not that, during continued use, the lactic acid solution becomes contaminated with foreign bacteria. Directly these are observed—either through the formation of mold, or similar phenomena—the liquid affected should be discarded and a new operation for the formation of lactic acid should be commenced.

Special advantages of this process are that, in proportion as the strength of the lactic acid solution increases, the duration of steeping the malt therein can be shortened. A single immersion, however, is sufficient, after which the malt is transferred to the kiln.

The full course of the successive malting periods and the periods of lactic-acid formation, proceeds as follows:

Malt grist, or malt grist and a proportion of other cereal grist, is "converted" in a mashtun, in the usual manner, and the saccharified constituents pass into the liquid. The latter is then run into a series of fermentation vessels, where a lactic-acid fermentation is started. If desired, this can be effected, and the fermentation period shortened, by adding already when mashing is completed, a small quantity of a liquid containing lactic bacteria.

A corresponding amount of barley is steeped, in the usual way, and allowed to chit on the floor, or in a known apparatus, such as a box or drum, until the embryo has grown to about twice the size of the corn. This germinated green malt is then steeped—in a third vessel, the steeping vat—in the lactic acid solution, prepared in the fermentation vessel, as described, and is left for the liquid to act for a period ranging between 12 and 20 hours, according to the degree of acidity of the liquid. The residuum about 75% of the liquid, is then drawn off, and placed in a second fermentation vessel of the series, in which it is made up to the proper volume by the addition of liquid from the mashtun, the whole being then allowed to ferment again. By this means, a higher degree of acidity is obtained, notwithstanding the initial dilution with the liquid drawn from the mashtun, and this lactic acid solution is used, in the manner described, in the next malting period. The residual solution obtained at the end of the steeping process, as described in the second period, is then led into a third fermentation vessel. The process is repeated, and five fermentation vessels have been found sufficient.

The full process, constituted by the several periods, eventually suffers—through the pouring away of a lactic acid solution, which has attained maximum acidity and has become unusable—a kind of interruption or gets a fresh start, in that a new, weak solution of lactic alone is now prepared in the fermentation vessel, by using the mashtun liquid. In so doing, the use of special bacterial cultures has been found superfluous, inasmuch as, for starting this fermentation, a small amount of a satisfactory biological solution of lactic acid from an earlier stage of the process can be used.

I claim:

1. In a process for producing acidified malt, the steps which comprise mashing cereal material, causing the mash liquid to ferment with the aid of lactic acid bacteria, steeping germinated malt in the lactic acid solution so obtained, transferring to a fermentation vessel the residual steeping liquor the acidity of which has increased, making up said residual liquor to substantially its original volume by the addition of a quantity of the mash liquid, allowing the liquor in the fermentation vessel to form additional lactic acid, and employing the strengthened liquor in steeping a fresh batch of germinated malt.

2. In a process for producing acidified malt, the steps which comprise steeping successive batches of germinated malt in a lactic acid liquor having an original lactic acid concentration of approximately 1.26% until said liquor has become contaminated with foreign bacteria, mashing barley material to form a mash liquid, making up the steeping liquor absorbed by the germinated malt during each batch steeping with said mash liquid, and replacing the contaminated steeling liquor with mash liquid which has previously been fermented with the aid of lactic acid bacteria.

THOMAS ROBERT DIXON.

REFERENCES CITED

The following references are of record in the file of this patent:

UNITED STATES PATENTS

| Number | Name | Date |
|---|---|---|
| 1,068,028 | Wahl | July 22, 1913 |
| 1,914,244 | Dixon | June 13, 1933 |

OTHER REFERENCES

Prescott and Dunn, Indust. Microbiology, 1st edition, McGraw-Hill Book Co.